US 8,375,782 B1

(12) United States Patent
Robinson et al.

(10) Patent No.: US 8,375,782 B1
(45) Date of Patent: Feb. 19, 2013

(54) MODEL HULL TESTING METHOD, PLATFORM, AND SYSTEM

(75) Inventors: Charles W. Robinson, Santa Fe, NM (US); William F. Burns, III, San Diego, CA (US)

(73) Assignee: M Ship Co., LLC, San Diego, CA (US)

(*) Notice: Subject to any disclaimer, the term of this patent is extended or adjusted under 35 U.S.C. 154(b) by 97 days.

(21) Appl. No.: 13/136,156

(22) Filed: Jul. 25, 2011

(51) Int. Cl.
*G01P 13/00* (2006.01)

(52) U.S. Cl. ............... 73/170.02; 73/170.01; 73/170.03; 340/539.26

(58) Field of Classification Search ............ None
See application file for complete search history.

(56) References Cited

U.S. PATENT DOCUMENTS

| | | | | |
|---|---|---|---|---|
| 3,704,442 | A * | 11/1972 | Wright | 367/96 |
| 4,821,567 | A * | 4/1989 | Nakamura et al. | 73/182 |
| 5,622,130 | A * | 4/1997 | Calderon et al. | 114/39.21 |
| 6,456,197 | B1 * | 9/2002 | Lauritsen et al. | 340/539.26 |
| 6,552,336 | B1 * | 4/2003 | Lloyd et al. | 850/15 |
| 6,691,635 | B2 * | 2/2004 | Murakami et al. | 114/230.1 |
| 6,957,579 | B1 * | 10/2005 | Antonelli et al. | 73/170.02 |
| 7,051,588 | B1 * | 5/2006 | Maltby | 73/161 |
| 2005/0199056 | A1 * | 9/2005 | Strong et al. | 73/170.29 |

* cited by examiner

*Primary Examiner* — Lisa Caputo
*Assistant Examiner* — Jermaine Jenkins
(74) *Attorney, Agent, or Firm* — Loyal McKinley Hanson

(57) ABSTRACT

A model hull testing method, platform, and system are disclosed that acquire model hull performance data about one or more hulls in an open-water environment, preferably testing two hulls simultaneously as they encounter essentially the same sea state. Avoiding tow-tank testing by providing a powered watercraft as an open-water testing platform, the method proceeds by supporting the model hulls on the testing platform, so they float in outboard positions, and then by acquiring data about hull performance as the testing platform and model hulls move together through an open body of water. A complement of data acquisition components acquires digital and analog data about the testing environment and model hull performance, preferably including platform motion, time and location information, wave characteristics, apparent wind speed and direction, and model hull drag and motion, with all data being recorded on an onboard laptop computer for later processing and analysis. A trimaran powered watercraft configuration and preferred data-acquisition components and techniques are also disclosed.

15 Claims, 8 Drawing Sheets

MODEL HULL TESTING METHOD, PLATFORM, AND SYSTEM

GOVERNMENT LICENSE RIGHTS

This invention was made with government support under contract with an agency of the U.S. Government, namely, Dept. of the Navy Contract No. H92222-10-C-0029. The government has certain rights in the invention.

BACKGROUND OF THE INVENTION

1. Technical Field

This invention relates generally to boat design and construction, and more particularly to the open-water testing of model hulls as a part of that effort, including a model hull testing method, a testing platform, and a testing system.

2. Description of Related Art

A boat designer undertakes hull-form performance and other model hull testing as an important part of boat design and development. Tank testing at a model basin site is one method usually used. A typical model basin site includes a water-filled basin (i.e., a towing tank) that may be as much as several meters wide and hundreds of meters long. The model hull is supported in the tank from above by a "heave post" that is attached to a tank-spanning carriage. The carriage moves along rails on either side of the tank to drive the model hull through the water in the tank while drag and other desired measurements are electronically recorded and analyzed. A wave generator may be employed to help determine the hull's likely real-life seagoing behavior when operating in various sea states.

To test one or more model hulls, the designer makes the necessary arrangements with a model basin site, ships the model hulls to the site, runs the desired tests in the time arranged, and then transports the hulls back from the model basin site. This is a common way of doing it, but it has certain drawbacks. Apart from the very significant time, expense, and inconvenience involved, rough-water and other real-world, open-water conditions do not exist at the towing tank. In addition, hull comparison data can be affected when attempting to compare the performance of two hulls because the hulls do not experience the same virtual sea states at the same time. For these, and other reasons that will become more apparent, a need exists for another way to test model hulls.

SUMMARY OF THE INVENTION

In view of the foregoing, it is a primary object of the present invention to provide a way to test model hulls without resorting to a towing tank. The present invention achieves this objective by providing a hull testing method, platform, and system for simultaneously testing two model hulls in open water. Accordingly, a first aspect of the invention concerns a model hull testing method that uses a powered watercraft to drive model hulls through a body of water in positions outboard of the powered watercraft for model hull testing purposes. A second aspect concerns a powered watercraft that functions as a platform for carrying out the testing method, and a third aspect concerns a testing system that includes two model hulls on such a platform along with a sophisticated complement of data acquisition components for acquiring and recording important digital and analog data about the testing environment and the two model hulls.

To paraphrase some of the more precise language appearing in the claims and further introduce the nomenclature used, the first aspect of the present invention (i.e., the model hull testing method) includes the step of providing a powered watercraft as a testing platform; the powered watercraft has a hull-supporting structure that functions as means for supporting two model hulls so that the two model hulls float in a body of water in positions outboard of the powered watercraft as the powered watercraft drives the two model hulls through the body of water. The method proceeds by supporting two model hulls on the powered watercraft so that they float in a sea, bay, lake, or other open body of water in positions outboard of the powered watercraft as the powered watercraft moves the two model hulls through the body of water. As the powered watercraft and the two model hulls move together through the body of water, with both model hulls thereby simultaneously encountering essentially the same open-water sea state, data is acquired and recorded about model hull performance, including sea state.

Data acquisition preferably includes model hull drag measurements, model hull motion measurements, platform motion measurements, sea state measurements, and apparent wind measurements, along with the ongoing recording of time and location information. The foregoing provides a comprehensive data set that enables a data analyst to account for the less controlled conditions of open water testing compared to tank testing. In addition, such side-by-side testing enables direct comparison of vertical accelerations, added resistance, and trim of two different model hulls in the same sea state. Furthermore, it enables the designer to test similar model hulls having subtle feature differences in the process of optimizing design. Moreover, testing of a series of model hulls may proceed using a constant reference model hull, and, beyond all that, testing time is cut in half by testing two model hulls at once and the testing avoids the significant time, cost, and inconvenience of using a tow tank.

According to the second aspect of the present invention, there is provided a model hull testing platform for testing two model hulls in an open-water body of water. The testing platform includes a powered watercraft having a central hull displacement body and two laterally projecting beams, frameworks, or other model-hull-supporting means, for supporting the two model hulls outboard of the central hull, to help avoid bow-wave influence on model hull performance. In one preferred embodiment, the hull-supporting means is such as to support the model hulls in port and starboard positions such that they extend at least partially forward of the forward edge of the central hull, to thereby further help avoid bow-wave influence on the data acquired. As the platform moves through the body of water, data acquisition components acquire data about platform motion, sea state, apparent wind, and time and location, all as environmental data relating to model hull performance. And, according to the third aspect of the invention, there is provided a model hull testing system that includes a model hull testing platform as outlined above, two model hulls supported on the testing platform, and data acquisition component for acquiring data about model hull drag and motion as the platform and two model hulls move together through the body of water in essentially the same open-water sea state.

Thus, the invention provides a method, platform, and system for acquiring model hull performance data in an open-water environment. Avoiding tow-tank testing by providing a powered watercraft as an open-water platform, the invention offers a rapid empirical innovation (REI) process for quick and cost-effective performance evaluation of innovative marine concept craft. The methodology eliminates the small repeatability issues caused by testing on different days in different conditions by testing two models, one preferably a baseline, at the same time so small differences can be measured. The platform measures the waves incident on the model hulls so that not only are the model hulls compared directly, the scaled sea state environment is measured and thus model hull motions can be scaled up and compared to full size for known sea states. As an added benefit, this also allows direct assessment of the SED-8 ride quality measurement (i.e., a standard relating to shock-mitigation). The following detailed description and accompanying illustrative drawings make the foregoing and other objects, features, and advantages of the invention more apparent.

DESCRIPTION OF THE PREFERRED EMBODIMENTS

Figure 1:
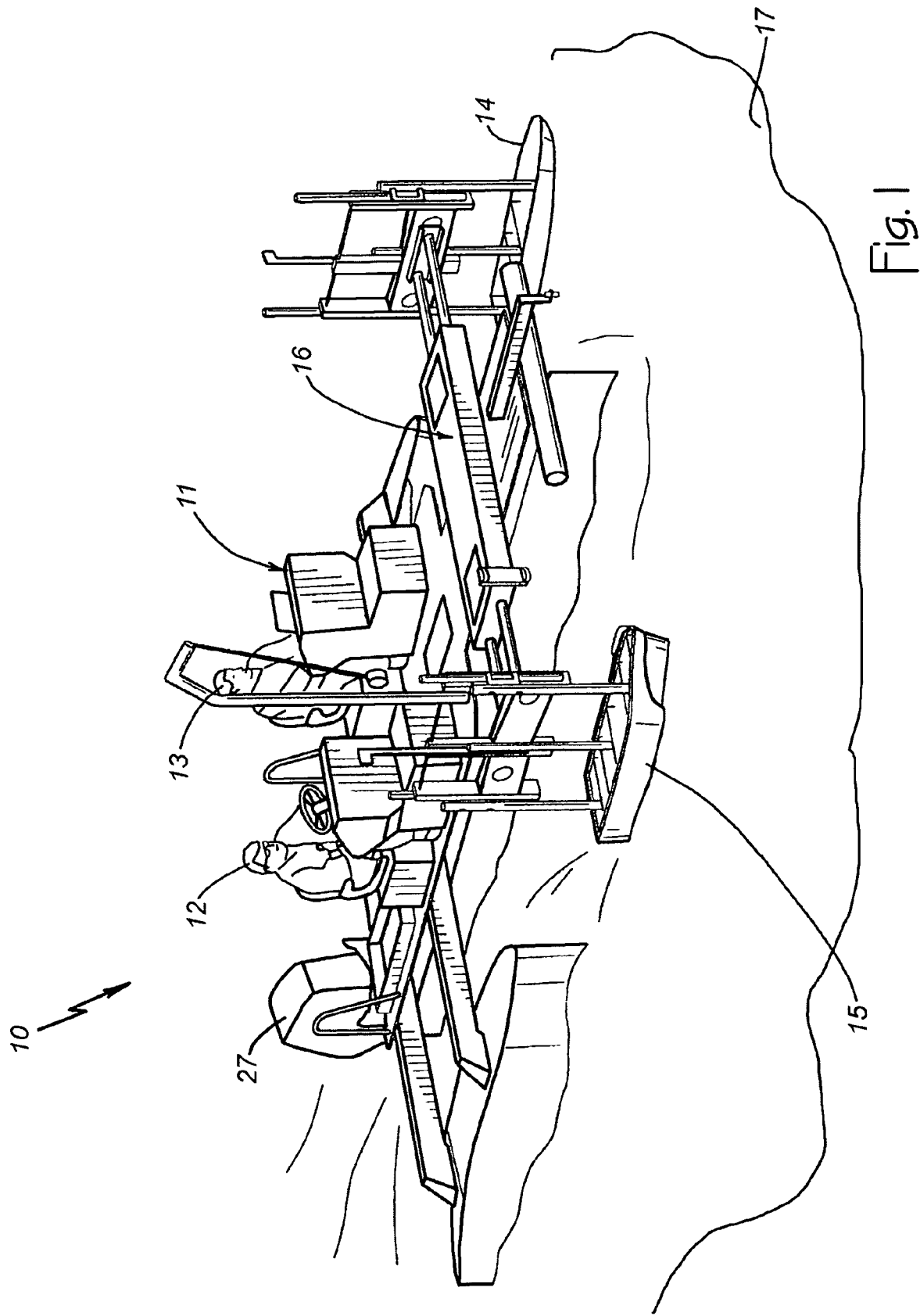
FIG. 1 of the drawings is a perspective view of a model hull testing system constructed according to the invention that is operating on an open body of water for simultaneous open-water model hull testing purposes, including twin, aft swept displacement hulls that provide enhanced lateral stability and support for crew and equipment behind the model hulls to reduce any platform-wave influence on the model hulls.

FIGS. 1-7 show various aspects of a model hull testing system 10 constructed according to the invention. First consider FIG. 1. It shows the system 10 to include a testing platform (i.e., a buoyant structure for supporting model hulls) that takes the form of a powered watercraft 11 on which a user 12 and an assistant 13 have mounted two model hulls 14 and 15 to be tested. A first or port model hull 14 and a second or starboard model hull 15 are mounted on the powered watercraft 11 with a support structure 16. The support structure 16 supports the two model hulls 14 and 15 on the powered watercraft 11 so that the two model hulls 14 and 15 float and move in an open body of water 17 in positions outboard of the powered watercraft 11 as the powered watercraft 11 is propelled through the body of water 17. As the powered watercraft 11 drives the two model hulls 14 and 15 through the open body of water 17 that way, instrumentation acquires data about hull performance.

As an idea of size, the illustrated powered watercraft 11 is about 20 feet long from bow to stern, while the model hulls 14 and 15 are typically six to eight feet long. The powered watercraft 11 is trailerable in the sense that a user can transport it to a user-selected open body of water on a trailer pulled by a motor vehicle (e.g., a sport utility vehicle, pickup truck, or other passenger vehicle). Of course, the inventive concepts described herein also apply to powered watercraft in non-trailerable sizes and model hulls of smaller and larger sizes.

Concerning terminology, a "powered watercraft," as that term is used herein, includes a displacement body having a bow, a stern, a port side, a starboard side. The powered watercraft has a central longitudinal axis (a centerline) that extends along a straight line from the bow to the stern intermediate the port side and the starboard side, a design or datum water line (DWL), and means for propelling the hull through a body of water (e.g., an outboard motor). A "model hull" herein is a smaller version of a full-size hull of interest, such that the model hull includes a scaled-down replica of the exterior shape of the full-size hull of interest. Interior weights may be added at the model hull gyradius to better replicate full-size hull characteristics.

Figure 2:
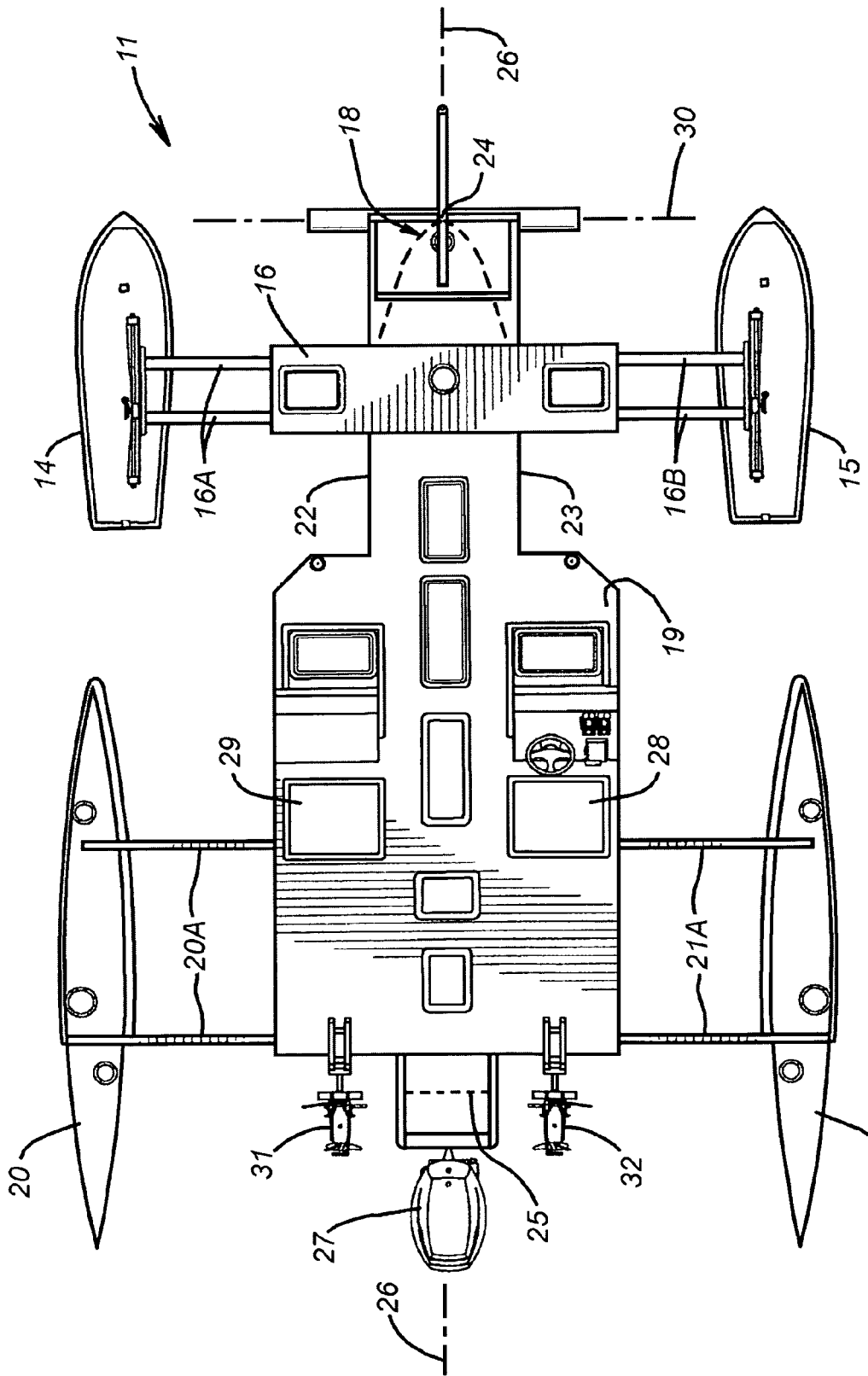
FIG. 2 of the drawings is overhead plan view of the platform (i.e., the powered watercraft) and the two model hulls of the model hull testing system.

With that terminology in mind, consider FIG. 2. It provides further structural details of the powered watercraft 11. Although various watercraft configurations may be used within the broader inventive concepts disclosed, the illustrated powered watercraft 11 in FIG. 2 is in a trimaran configuration, with a central hull 18 beneath a deck structure 19, and two amas. A port ama 20 is supported by a port outrigger structure 20A in a position outboard of a port side 22 of the central hull 18 and a starboard ama 21 is supported by a starboard outrigger structure 21A in a position outboard of a starboard side 23 of the central hull 18. The central hull 18 has a bow 24, a stern 25, and a central axis of elongation or centerline 26 extending in a straight line between the bow 24 and the stern 25, midway between the port side 22 and the starboard side 23. The support structure 16 includes a laterally extending and laterally adjustable first or port portion 16A that supports the port model hull 14 outboard of the port side 24, and a laterally extending and laterally adjustable second or starboard portion 16B that supports the starboard model hull 15. An outboard motor 27 is included to propel the powered watercraft 11 and two operator positions 28 and 29 are provided topside on the deck 19 (e.g., for the user 12 and the assistant 13 identified in FIG. 1). Of course, an inboard motor may be used instead.

Preferably, the amas 20 and 21 occupy positions rearward of the model hull support structure 16, to reduce their influence on model hull performance during testing. In addition, the model hulls 14 and 15 occupy outboard positions for reduced bow-wave influence of the bow wave of the central hull 18. The twin aft swept displacement hulls (amas 20 and 21) provide very stable lateral stability and support for crew and equipment behind the model hulls to reduce any hull wave influence on the model hulls. Also, the illustrated model hulls 14 and 15 occupy positions such that they at least partially extend forward of a forward edge 30 of the central hull 18, to thereby further reduce bow-wave influence, although that position is not always necessary within the broader inventive concepts disclosed. FIG. 2 also shows port and starboard outboard electric outboard motors 31 and 32 at the stern 25 for low-speed, precise speed runs during testing.

Figure 3:
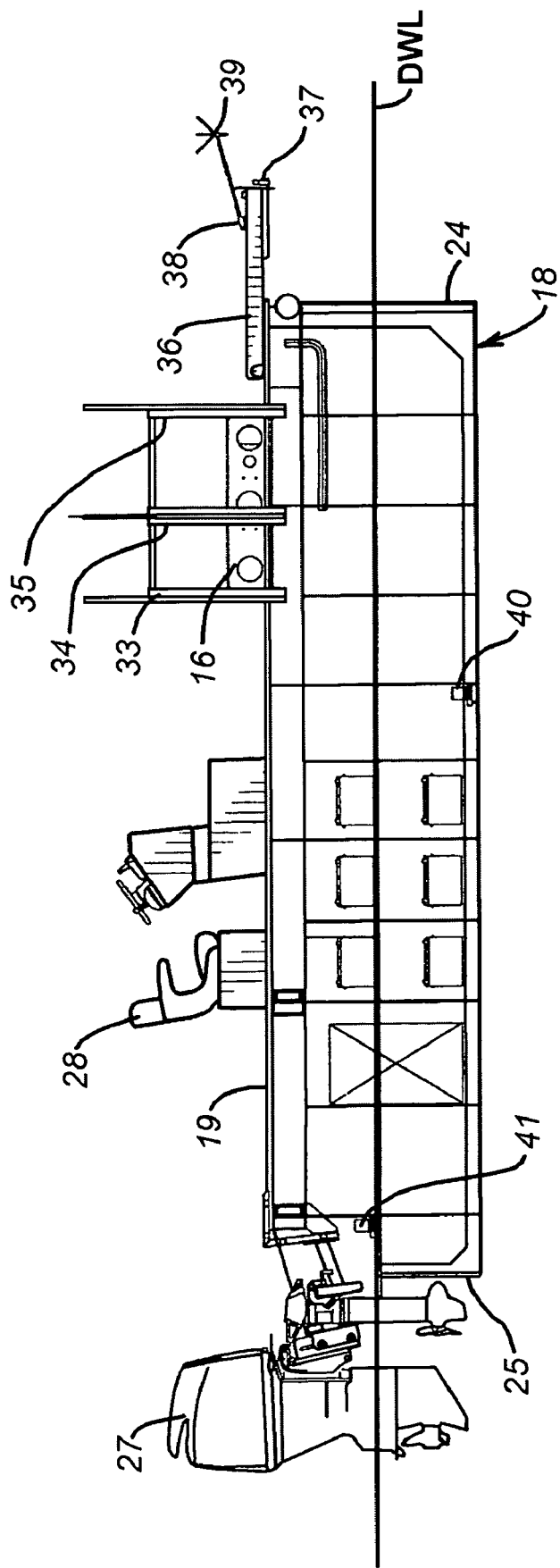
FIG. 3 is a diagrammatic starboard profile of the powered watercraft that show major components of the system.
Figure 4:
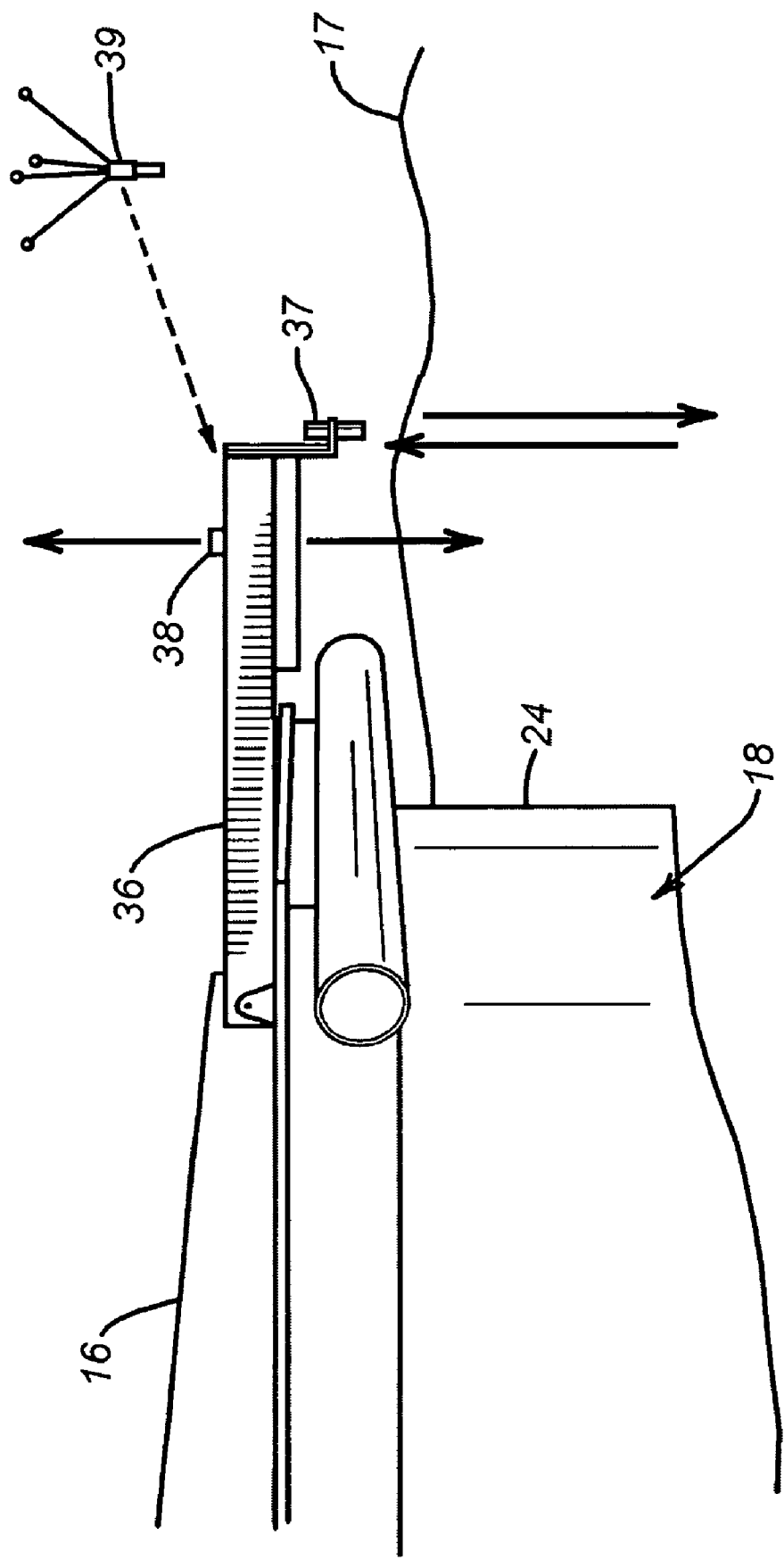
FIG. 4 is an enlarged diagrammatic view of components on the bow of the powered watercraft.

FIG. 3 is a diagrammatic profile view of the central hull 18 (i.e., a starboard side elevation view), while FIG. 4 is an enlarged diagrammatic view of the forward portion of the powered watercraft 11 and associated instrumentation (i.e., data acquisition components). FIG. 3 identifies the bow 24, the stern 25, and the deck structure 19, along with the support structure 16, the outboard motor 27, the user operating position 28, and a datum or design water line (DWL) of the hull 18. Three heave posts 33, 34, and 35 are visible; in operation, they are connected to the starboard model hull 15 shown in FIGS. 1 and 2, as will be subsequently discussed.

A forwardly projecting spar or bowsprit 36 (FIGS. 3 and 4) extends forward of the bow 24; it supports an ultrasonic wave probe 37 pointed directly downward that provides information about real-time incident waves. The ultrasonic wave probe 37 outputs data (e.g., a data stream) about wave height a meter ahead of the bow 24. The bowsprit 36 also supports a platform accelerometer 38 for measuring wave-probe acceleration/motions, thereby allowing post-test determination of platform heave (at the point of the wave probe) and a remapping of the wave profile time history in fixed Earth coordinates obtained by an onboard global positioning system (GPS) receiver. The illustrated accelerometer 38 is a two-degree-of-freedom (2-DOG), although other accelerometers may be used instead. The illustrated accelerometer 38 takes the sensor raw data output, formats it as an NMEA string, and outputs it as an R232 serial data stream at a 115200 kbps rate, thereby providing data about movement of the bowsprit 36 and the wave probe 37 (NMEA being a combined electrical and data specification for communications between marine electronic devices that is controlled by the National Marine Electronics Association). Of course, other data communication formats and links may be used instead.

In addition, the bowsprit 36 supports an ultrasonic anemometer 39 that provides important information about apparent wind direction and apparent wind speed. It may take the form of a known type of yachting anemometer that outputs a data stream about wind direction and speed. A speed sensor 40 is located about two meters aft of the bow 24 (FIG. 3) and an impeller-and-fin assembly 41 is located at the stern 25 (e.g., the assembly available from JDC Electronics S.A., Switzerland through N Tech USA of Holmen, Wis. under the trademark SPEED WATCH) to provide data about actual hull speed through water. Of course, other speed-measuring means may be used instead. Platform speed through water is also measured using propeller sensors, and the GPS receiver provides speed over ground (SOG) data along with latitude and longitude data for track reconstruction. Based upon the foregoing and subsequent descriptions, one of ordinary skill in the art can readily implement instrumentation onboard the powered watercraft 11 for the broader hull-testing methodology of the present invention.

Figure 5:
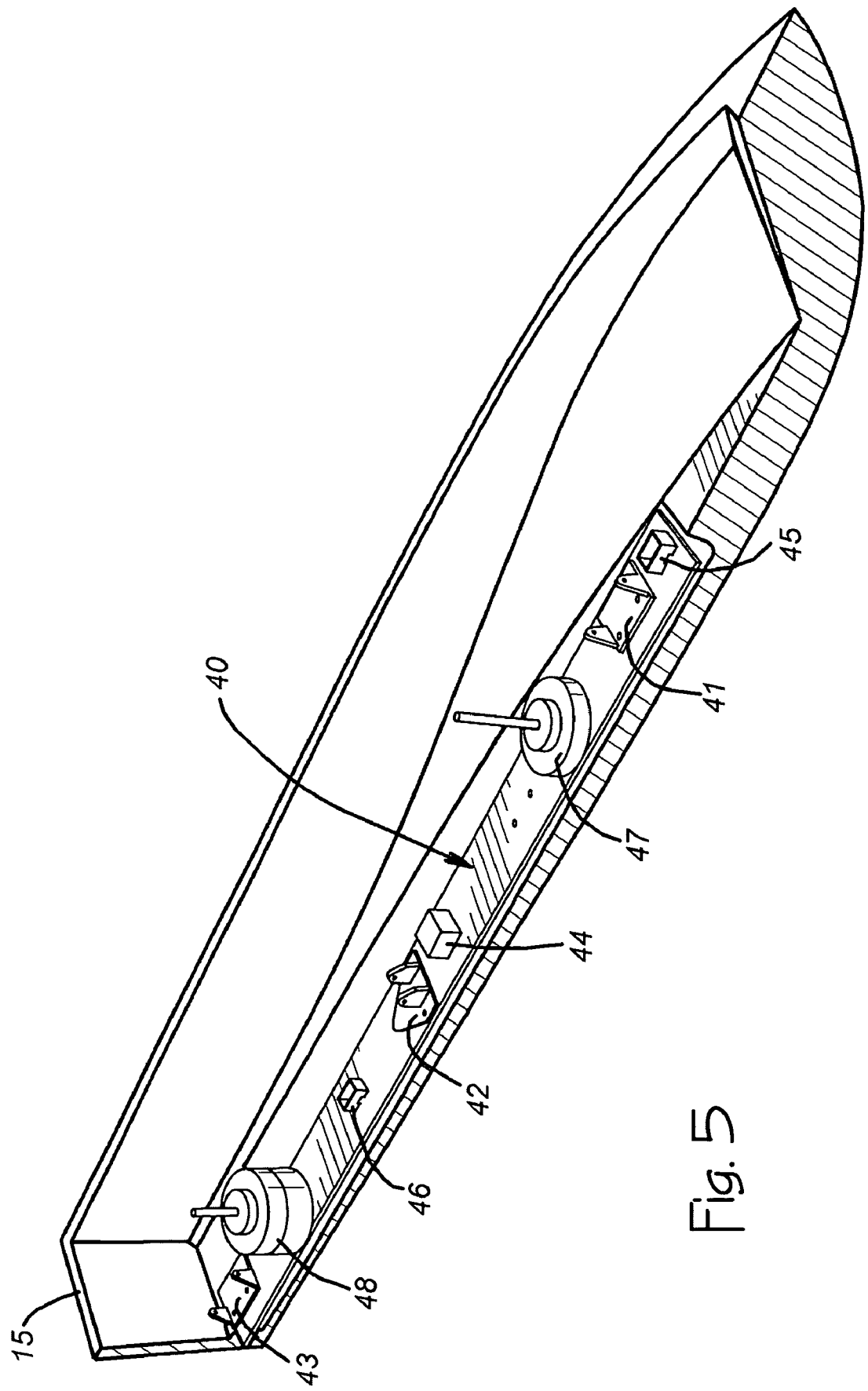
FIG. 5 is an enlarged cross sectional view of the starboard model hull and its keel mounting strip, as the model hull appears in a vertical, bisecting, longitudinally extending plane.

FIG. 5 is a cross sectional view of the starboard model hull 15 as viewed in a vertical, longitudinally extending, bisecting plane. This view exposes heave-post-mounting hardware in the form of what may be called a keel mounting strip 40. The keel mounting strip 40 is the combination of a rigid strip attached to the model hull 15 in the position illustrated and the components on it that together function as an interface between the model hull 15 and the three heave posts 33, 34, and 35 shown in FIGS. 3 and 6. It provides a consistent heave-post mounting that also functions as means for mounting sensors and weights on the model hull 15 in a consistent manner. Thus, the keel mounting strip 40 includes a first bracket 41 (a forward yaw control bracket) that functions as means for mounting the first heave post 33, a second bracket 42 (a drag bracket) that functions as means for mounting the second heave post 34, and a third bracket 43 (an aft yaw control bracket) functions as means for mounting the third heave post 35. In addition, the keel mounting strip 40 includes a six degree-of-freedom (6-DOF) accelerometer 44 at the center of gravity (CG), a forward 2-DOF accelerometer 45, an aft 2-DOG accelerometer 46, and first and second ballast weights 47 and 48.

The 6-DOF sensor (i.e., the 6-DOF accelerometer 44) outputs data about movement at the CG as a serial data stream (e.g., taking the sensor raw data output, formatting it as an NMEA string, and outputting it as an RS232 serial data stream at a 115200 kilo-bits-per-second rate (kbps). That data is used with data from the 2-DOF vertical sensors (i.e., the 2-DOF accelerometers 45 and 46) to enable post processing analysis of accelerations anywhere on the model hull 15. RS232, or Recommended Standard 232, refers to a well-known series of standards that define the electrical characteristics and timing of signals used in computer serial ports.

The heave post 34 includes a drag-force load cell (not shown separately) that outputs drag-related data (i.e., resistance-related analog data), while the heave posts 33 and 35 include load cells (not shown separately) that output yaw-related analog data. The drag-force load cell function on each model is accomplished with a beam type strain gauge load cell with 100-pound range (e.g., the strain gauge load cell available from Omega Engineering, Inc.). These load cells are designed to operate in all weather or wet industrial environments, while their low profile and high side load capability simplify mechanical installation considerations and their weather sealing, high precision, and repeatability make them ideally suited for rugged industrial applications.

Figure 6:
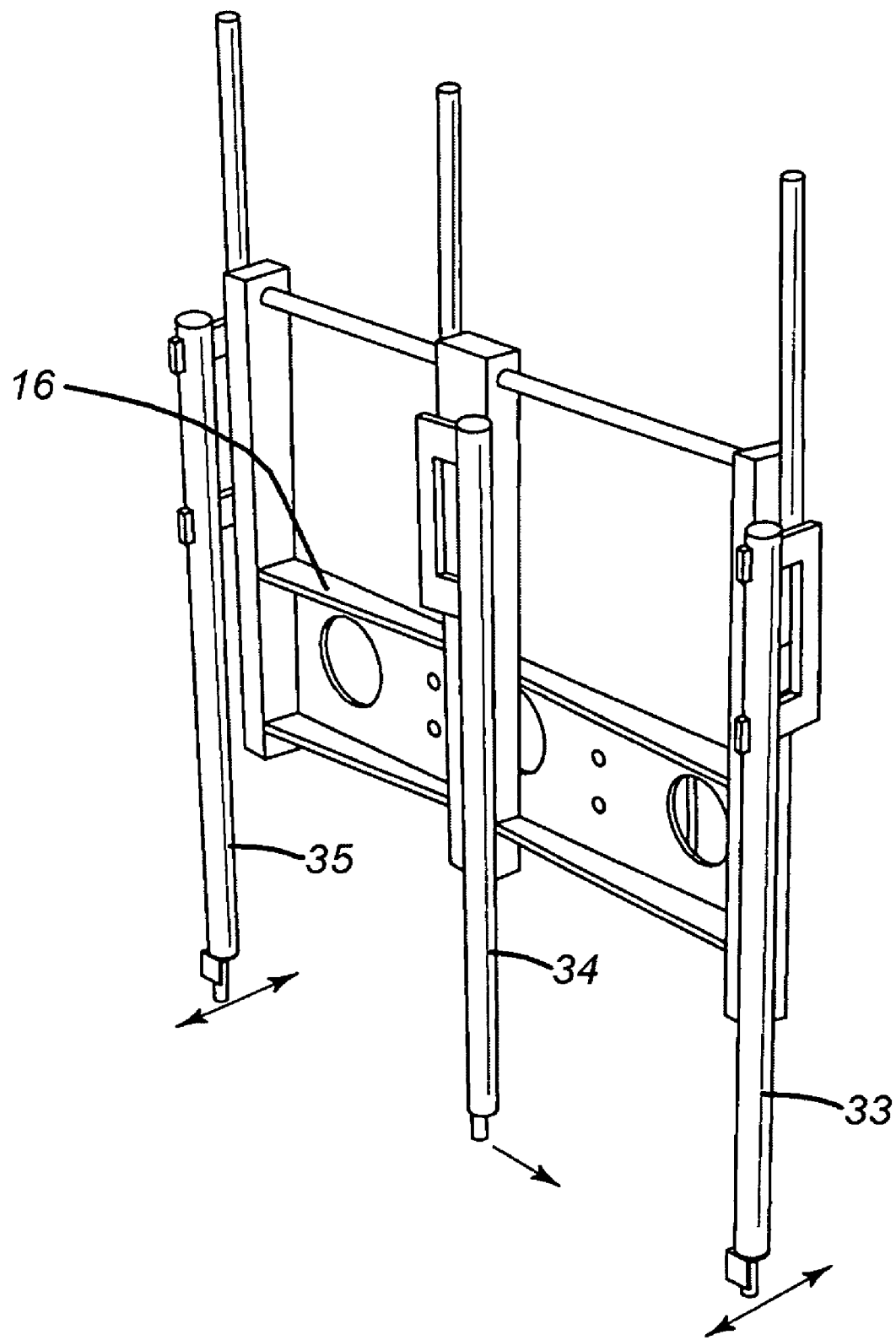
FIG. 6 is an enlarged perspective view of the three heave posts.

FIG. 6 is an enlargement of the heave posts 33, 34, and 35 that includes arrows depicting the resistance and yaw information obtained. Each heave post is a rigid member that extends between the model hull and the support structure 16. Each accommodates up and down movement of the model hull to which it is attached while including a load cell that provides the desired drag or yaw data. The port model hull 14 is arranged in a similar manner to that described above for the starboard model hull 15. The invention is not limited to three heave posts, however. One or two heave posts may be used, instead, within the broader inventive concepts disclosed.

Figure 7:
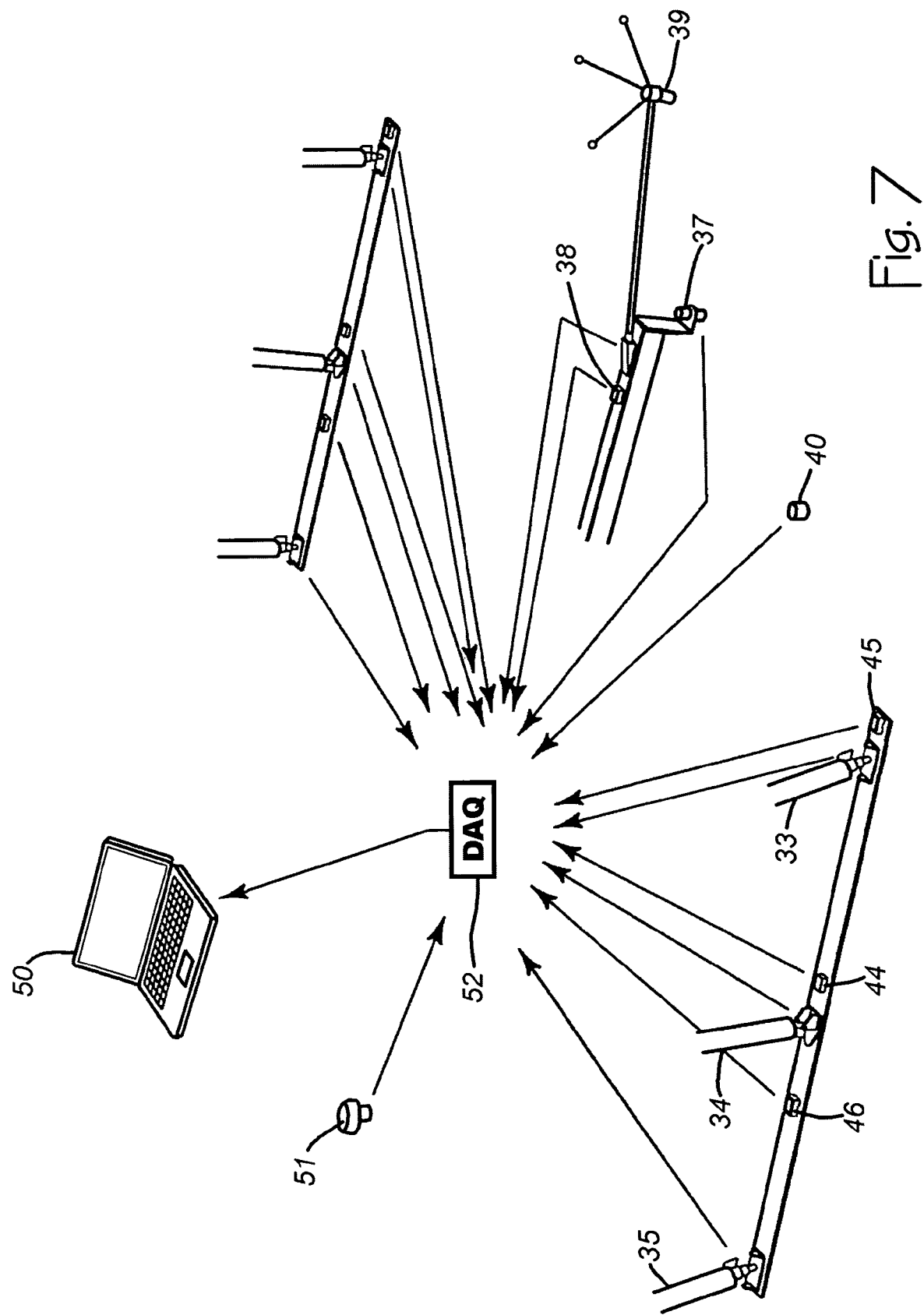
FIG. 7 is a diagrammatic representation of the data acquisition system.

FIG. 7 provides an overview of the data acquisition and recording system. A laptop computer 50 is provided onboard for real-time data analysis and data logging. Data that the laptop computer 50 received from the various sensors include data from the wave probe 37, the platform accelerator 38, and the anemometer 39, along with data from the speed sensor 40 and data from a GPS receiver 51. The illustrated GPS receiver 51 is a 18-5 Hertz integrated-antenna processor available under the trademark GARMIN that outputs standard NMEA strings at 38400 bits-per-second (bps). The NMEA strings used are GLL (i.e., geographic position in latitude and longitude data) and VTG (i.e., vector track and speed over ground) to give the latitude, longitude and SOG. In addition, data is received from the starboard model hull 15, including drag and yaw data from the load cells on the first, second, and third heave posts 33, 34, and 35, together with data from the 6-DOF accelerator 44, the forward vertical accelerator 45 and the aft vertical accelerator 46. Of course, data is received from the port model hull 14 also, in a similar manner from similar sensors (components for the components on the port model hull 14 are similar to the components for the starboard model hull 15, and so they are not individually identified, to keep the drawings less cluttered). The arrows in FIG. 7 represent cabling, or other suitable data communication links, between the data acquisition components.

Serial data streams and analog data from the load cells on the heave posts (and their excitation voltage) are processed by suitable means, such as, for example, a 16-input serial board and a 4-input, 18 bit analog board in a data acquisition box represented by a DAQ 52 in FIG. 7 (e.g., the 5-slot PXI chassis with the part designator PXI-1033 that is available from National Instruments of Austin, Tex.). That front end links to a standard laptop computer 50 via a PCMCIA MXI interface (PCMCIA being a standard originated by the Personal Computer Memory Card International Association of San Jose, Calif. for personal computer cards, and MXI relating to the smaller and faster cards covered by the EXPRESS-CARD trademark of that Association). Computer software on the laptop 50 time-stamps and stores the data to a solid state disk (SSD) at up to 600 Hertz. Of course, additional sensors can be included along with various data handling techniques without departing from the broader inventive concepts disclosed. Based upon the foregoing and subsequent descriptions, one of ordinary skill in the art can readily implement a data acquisition and recording system for a model hull testing system constructed according to the present invention.

Figure 8:
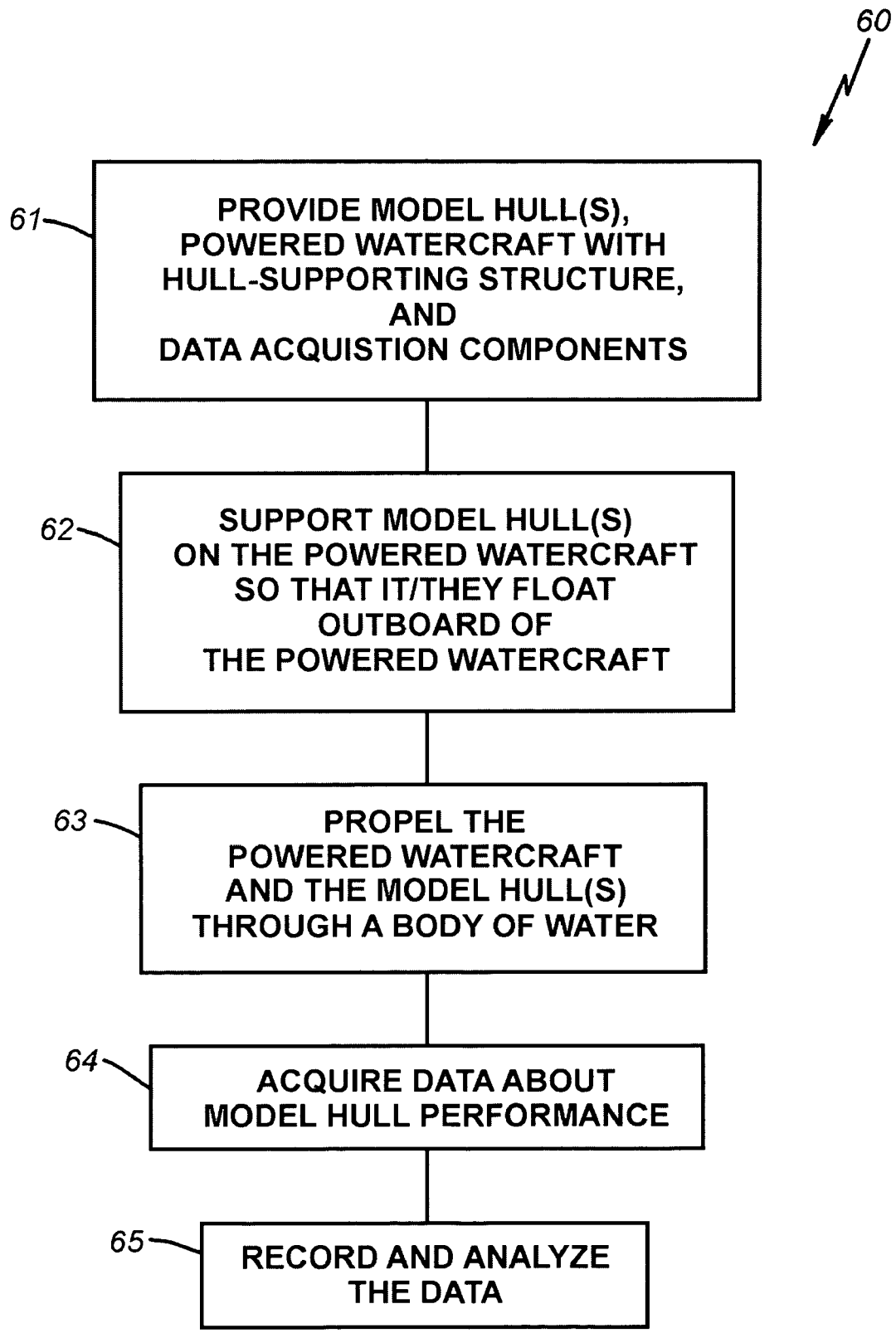
FIG. 8 is a block diagram of the steps performed in the method of the present invention.

Turning now to FIG. 8, it shows a block diagram 60 of the steps involved in model hull testing according to the present invention. First, the method includes the step of providing a model hull (preferably, two model hulls), a powered watercraft having a model-hull-supporting structure, and data acquisition components, as indicated in a block 61. Those items may take the form of model hulls such as the model hulls 14 and 15 (shown in FIGS. 1, 2, and 5), a powered watercraft such as the powered watercraft 11 (FIGS. 1, 2, 3, and 4), and a complement of data acquisition components such as those described above that are summarized in FIG. 7. The method proceeds by supporting the model hull (preferably two model hulls) on the powered watercraft so that the one or two model hulls will float outboard of the powered watercraft as described above, as indicated in a block 62 in FIG. 8. This step may include the user 12 and the assistant 13 in FIG. 1 attaching the model hulls 14 and 15 to the support structure 16 using heave posts such as the heave posts 33, 34, and 35 in FIG. 6 and keel mounting strips such as the keel mounting strip 40 in FIG. 5.

Next, with the powered watercraft and the one or two model hulls afloat in a selected body of water, the user 12 causes the powered watercraft and the one or two model hulls to be propelled through the body of water as illustrated in FIG. 1 and indicated by a block 63 in FIG. 8. The illustrated powered watercraft uses an outboard motor 27 for that purposes, although the invention is not limited to the use of outboard motors. As movement through the body of water occurs, data is acquired about performance of the one or two model hulls using the complement of data acquisition components as indicated by a block 64 in FIG. 8. That data is recorded and analyzed as described above and indicated by a block 65. The step of acquiring data about performance of the one or two model hulls includes acquiring data indicative of one or more (preferably all) of the following:

1. Model hull drag,
2. Model-hull motion,
3. Six degrees of freedom at a center-of-gravity of each of the two models,
4. Vertical acceleration and trim at a bow of each of the two models,
5. Vertical acceleration and trim at a stern of each of the two models,
6. Wave time history and spectrum, platform speed,
7. Speed over ground and the latitude and longitude for track reconstruction, and
8. Apparent wind speed and direction.
9. Water-flow visualization using still cameras and/or video cameras.

Stated another way, the method of the present invention includes the step of providing a powered watercraft having a hull-supporting structure that functions as means for supporting one or two model hulls so that the model hulls float in a body of water in positions outboard of the powered watercraft as the powered watercraft moves the one or two model hulls through the body of water. The method proceeds by supporting one or two model hulls on the powered watercraft with the hull-supporting structure, propelling the powered watercraft through the body of water, and acquiring data about performance of the one or two model hulls as the powered watercraft and the one or two model hulls move together through the body of water. That way, a user can acquire and record data about the performance of two model hulls simultaneously, and, in the case of two model hulls, realize cost benefits of testing two model hulls together. The step of supporting the one or two model hulls may be accomplished, for example, by attaching one or more heave posts on the hull-supporting structure to keel mounting strips on the two model hulls. Of course, other hull-supporting steps may be undertaken within the broader inventive concepts of the methodology disclosed.

At the end of a day's testing, for example, the data is uploaded to a database that is available for processing and analyzing the data (e.g., the data base software product that is available under the trademark MICROSOFT ACCESS from Microsoft Corporation of Redmond, Wash.). The data is logged in raw form and all calibrations are done at post processing to allow for multiple re-processing as desired. Software queries the database and performs the following functions:

1. Apply the latest calibrations for drag, offsets, biases, etc.
2. Filter the data to extract the valid test segments, where speed, direction, motions, etc. are stable and within operating parameters.
3. Generate naval architecture plots of drag, trim, speed.
4. Generate plots relating to various configurations, such as drag, trim, speed, displacement, LCG location
5. Generate model to model comparison plots for naval architecture consideration.
6. For rough water testing, the platform motion and ultrasonic wave measurements are processed using custom algorithms to determine the incident waves.
7. Model motions are analyzed, and SED8 calculations are made to determine the ride quality and safety aspects.
8. Response Amplitude Operator plots are generated, along with sea spectra for use in comparison with tank data.

In addition, the database handles all the calibration data, various models and model configurations, test matrices, and environmental conditions such as wind speed and direction. Of course, the foregoing details provide an example that may vary significantly within the broader inventive concepts.

Data analysis may be accomplished using known types of computer hardware and software, or customized task-specific hardware and/or software. Preferably, the platform accelerations are integrated across time to deduce a heave time history of the platform (at the location of the wave probe), with a constant of integration imposed such that the long-term vertical displacement of the platform is zero. Mathematically, the now-filtered wave probe readings are summed with the integrated platform heave values to yield a wave height time history (in the frequency of encounter regime) in vertical World coordinates. Next, the known forward speed of the platform is used to transfer the wave time history from a frequency of encounter regime to a fixed, World coordinate wave frequency regime. From that, a Fourier analysis is performed to transfer the wave-height versus wave-frequency to a wave energy spectra distribution, from which dominate wave frequencies, significant wave height, and so forth are deduced.

Thus, the invention provides a model hull testing method, platform, and system for simultaneously testing two model hulls in open water instead of resorting to a towing tank and its limitations. Although an exemplary embodiment has been shown and described, one of ordinary skill in the art may make many changes, modifications, and substitutions without necessarily departing from the spirit and scope of the invention. As for the specific terminology used to describe the exemplary embodiments, it is not intended to limit the invention; each specific term is intended to include all technical equivalents that operate in a similar manner to accomplish a similar purpose or function.

What is claimed is:

1. A method for open-water testing of a model hull, comprising:
   providing a powered watercraft having a hull-supporting structure that functions as means for supporting the model hull so that the model hull floats in a body of water in a position outboard of the powered watercraft as the powered watercraft moves the model hull through the body of water;
   supporting the model hull on the powered watercraft with the hull-supporting structure;
   propelling the powered watercraft through the body of water; and
   acquiring data about performance of the model hull as the powered watercraft and the model hull move together through the body of water;
   thereby to acquire and record data about the performance of the model hull.

2. A method as recited in claim 1, wherein the step of acquiring data about performance of the model hull includes acquiring data indicative of at least one of (i) model hull drag, (ii) model-hull motion, (iii) wave time history and spectrum, (iv) platform motion, and (v) apparent wind speed and direction.

3. A method for open-water testing of model hulls, comprising:
   providing a powered watercraft having a hull-supporting structure that functions as means for supporting two model hulls so that the two model hulls float in a body of water in positions outboard of the powered watercraft as the powered watercraft moves the two model hulls through the body of water;
   supporting two model hulls on the powered watercraft with the hull-supporting structure;
   propelling the powered watercraft through the body of water; and
   acquiring data about performance of the two model hulls as the powered watercraft and the two model hulls move together through the body of water;
   thereby to acquire and record data about the performance of the two model hulls simultaneously.

4. A method as recited in claim 3, wherein the step of supporting the two model hulls on the powered watercraft includes:
   supporting a first model hull of the two model hulls on the powered watercraft so that the first model hull floats outboard of the powered watercraft on a port side of a centerline of the powered watercraft; and
   supporting a second model hull of the two model hulls on the powered watercraft so that the second model hull floats outboard of the powered watercraft on a starboard side of the centerline.

5. A method as recited in claim 3, wherein the step of supporting the two model hulls on the powered watercraft includes supporting the two model hulls on the powered watercraft so that the two model hulls float in positions at least partially forward of the bow.

6. A method as recited in claim 3, wherein the step of acquiring data about performance of the two model hulls includes acquiring data indicative of model hull drag.

7. A method as recited in claim 3, wherein the step of acquiring data about performance of the two model hulls includes acquiring data indicative of model-hull motion.

8. A method as recited in claim 7, wherein the step of acquiring data indicative of model-hull motion includes acquiring data indicative of six degrees of freedom at a center-of-gravity of each of the two models.

9. A method as recited in claim 7, wherein the step of acquiring data indicative of model-hull motion includes acquiring data indicative of vertical acceleration and trim at a bow of each of the two models.

10. A method as recited in claim 7, wherein the step of acquiring data indicative of model-hull motion includes acquiring data indicative of vertical acceleration and trim at a stern of each of the two models.

11. A method as recited in claim 3, wherein the step of acquiring data about performance of the two model hulls includes acquiring data indicative of wave time history and spectrum.

12. A method as recited in claim 3, wherein the step of acquiring data about performance of the two model hulls includes acquiring data indicative of platform speed.

13. A method as recited in claim 3, wherein the step of acquiring data about performance of the two model hulls includes acquiring data indicative of speed over ground and the latitude and longitude for track reconstruction.

14. A method as recited in claim 3, wherein the step of acquiring data about performance of the two model hulls includes acquiring data indicative of apparent wind speed and direction.

15. A method as recited in claim 3, wherein the step of acquiring data about performance of the two model hulls includes recording the data for processing and analysis.

* * * * *